(12) United States Patent
Grbovic

(10) Patent No.: US 7,420,351 B2
(45) Date of Patent: Sep. 2, 2008

(54) POWER-FACTOR CORRECTION DEVICE FOR VARIABLE SPEED DRIVE

(75) Inventor: Petar Grbovic, Vernon (FR)

(73) Assignee: Schneider Toshiba Inverter Europe SAS, Pacy-sur-Eure (FR)

( * ) Notice: Subject to any disclaimer, the term of this patent is extended or adjusted under 35 U.S.C. 154(b) by 10 days.

(21) Appl. No.: 11/559,077

(22) Filed: Nov. 13, 2006

(65) Prior Publication Data

US 2007/0114962 A1 May 24, 2007

(30) Foreign Application Priority Data

Nov. 22, 2005 (FR) .................................. 05 53546

(51) Int. Cl.
*H02P 1/38* (2006.01)
(52) U.S. Cl. ........................ 318/772; 318/800; 318/802; 363/44; 363/89
(58) Field of Classification Search ................ 318/772, 318/803, 771, 770; 219/130.1; 322/19, 28, 322/36, 222
See application file for complete search history.

(56) References Cited

U.S. PATENT DOCUMENTS

| | | | | |
|---|---|---|---|---|
| 4,879,639 A | * | 11/1989 | Tsukahara | ................... 363/37 |
| 6,175,217 B1 | * | 1/2001 | Da Ponte et al. | ............... 322/19 |
| 6,329,636 B1 | * | 12/2001 | Geissler | .................... 219/130.1 |
| 6,815,639 B2 | * | 11/2004 | Geissler | .................... 219/130.1 |
| 2006/0022648 A1 | * | 2/2006 | Ben-Yaakov et al. | ......... 323/222 |
| 2007/0146658 A1 | * | 6/2007 | Van Mierlo et al. | ........... 355/30 |

OTHER PUBLICATIONS

Manfred Reddig, "Optimization of the input and output stages in high efficiency power suppies," 2003 IEEE International Conference on Industrial Technology, vol. 2, Dec. 10, 2003, pp. 1190-1195, XP-002401581.
Alfio Consoli, et al., "Single Chip Integration for Motor Drive Converters With Power Factor Capability," IEEE Transactions on Power Electronics, vol. 19, No. 6, Nov. 2004, pp. 1372-1379, XP-002401582.
Zhigan Wu, et al., "Line adaptive PAM&PWM drive for BLDCM," IPEMC 2004, vol. 3, Aug. 14, 2004, pp. 1263-1267, XP-002401583.

* cited by examiner

*Primary Examiner*—Paul Ip
(74) *Attorney, Agent, or Firm*—Oblon, Spivak, McClelland, Maier & Neustadt, P.C.

(57) ABSTRACT

A variable speed drive for a three-phase electric motor, including a rectifier module supplying a rectified voltage from a single-phase alternating current network, a voltage step-up module supplying a regulated bus voltage, and an inverter module supplying a control voltage to the motor. The variable speed drive includes a hybrid power-factor correction device that drives the voltage step-up module and that includes a digital circuit including a voltage step-up module supplying a correction signal based on a measurement signal of the bus voltage and an analog circuit supplying a driver signal to the step-up module based on a measurement signal of the rectified voltage and based on the correction signal.

10 Claims, 4 Drawing Sheets

POWER-FACTOR CORRECTION DEVICE FOR VARIABLE SPEED DRIVE

TITLE OF THE INVENTION

BACKGROUND OF THE INVENTION

Field of the Invention

Figure 1:
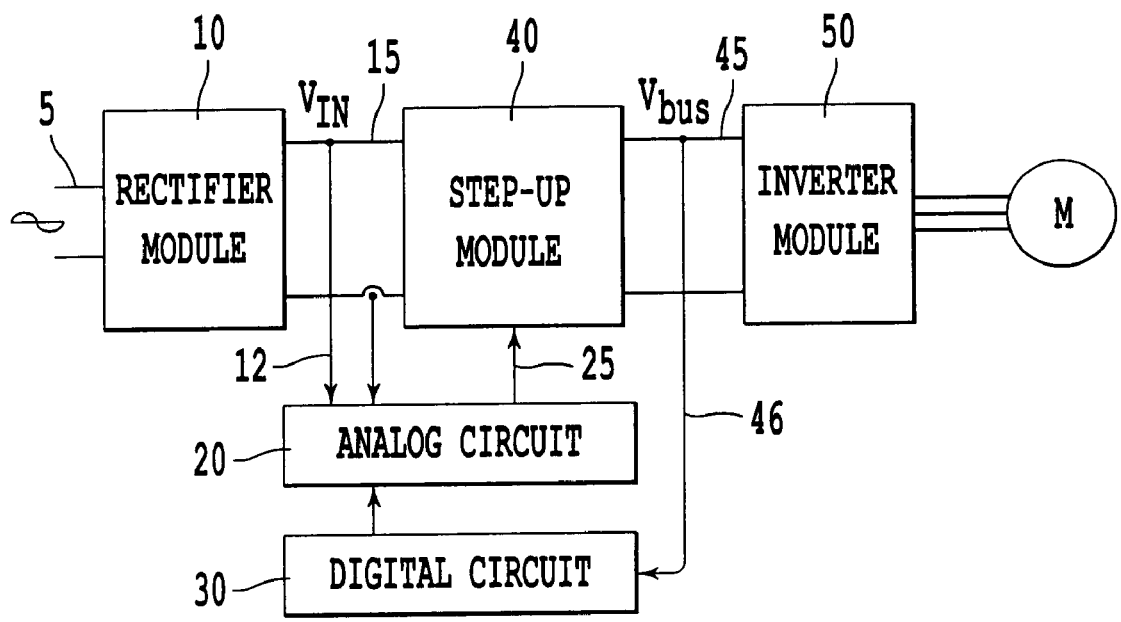

The present invention generally relates to the field of variable speed drives of the frequency converter type intended to control electric motors, and in particular to a single-phase power-factor correction device and its control circuit, incorporated in a low-power variable speed drive.

As is known, a variable speed drive of the frequency-converter type comprises an input rectifier which supplies a direct current (DC) voltage from an external alternating current (AC) power supply network and a pulse width module (PWM) inverter which powers a three-phase AC motor. The variable speed drive also comprises a high-capacitance capacitor which is linked between the input rectifier and the PWM inverter. In low power applications, for example up to a power of approximately 2 kW, the variable speed drive is often powered by a 110 V or 230 V single-phase AC electrical power supply network.

The input rectifier normally uses a diode bridge, which supplies a rectified voltage. The instantaneous consumed power oscillates at a frequency equal to twice the input frequency of the AC power supply network (for example 100 or 120 hertz). However, at the output of the variable speed drive, the load driven by the variable speed drive, such as a three-phase motor, requires a constant instantaneous power, otherwise the motor exhibits a ripple in the torque and speed fluctuations.

This is why a large energy storage element is required as ballast between the input and the output of the variable speed drive. A large electrolytic capacitor or a series of capacitors are widely used for the storage element. The diodes of the input rectifier conduct for a short period around the maximum input voltage. Therefore, the input current is a short pulse with a high amplitude, which comprises the fundamental frequency (for example 50 or 60 hertz) and higher frequency harmonics. The peak current can thus be several times greater than the amplitude of the fundamental harmonic. Such a peak current produces numerous problems, such as reducing the possibilities of the power supply network, overloading the neutral line, overheating the distribution transformers, motors, etc. In practice, the more harmonics there are in the current, the greater the root mean square (rms) current becomes for one and the same given active power.

To reduce the input harmonics and comply in particular with the IEC 61000 standards, a phase compensation circuit is used, also called a power-factor correction (PFC) circuit. Normally, the phase compensation circuits are based on a DC voltage step-up circuit which is placed at the output of the diode-based input rectifier so as to deliver the DC bus voltage. The phase compensation circuits are normally made up of a power stage and two interconnected control loops, a slow regulation loop for the bus voltage and a high bandwidth input current regulation loop. The voltage regulator needs to enable the DC bus voltage to be kept constant and independent of the variation in the load and the input voltage. The task of the input current regulator is to control the instantaneous input current as a function of the bus voltage regulator and a reference current profile demanded for compliance with the standards (in particular IEC 61000-3-2 and 61000-3-12).

According to a first solution, the control circuits for step-up devices with phase compensation have long been entirely analogue circuits for low power levels (see document U.S. Pat. No. 6,373,734). Such a control circuit comprises in particular a DC bus voltage regulator, an analogue multiplier and an analogue current regulator.

The current regulator supplies an instruction to the power-factor correction circuit. It can operate in several modes, such as, for example, peak or average current control with constant switching frequency, constant conduction time and variable switching frequency, integral-mode control and control by peak current hysteresis. The analogue multiplier receives as input a measurement signal of the rectified voltage and a correction set-point coming from the DC bus voltage regulator to deliver as output a reference current to the current regulator.

All these service operations can be incorporated in a single component. Nevertheless, such a component is expensive and complicated, particularly because of the multiplier to be produced in analogue technology.

A second solution often used comprises an entirely digital device. All the control operations of the power-factor correction circuit, including bus voltage regulation, calculation of the correction signal and regulation of the current are then carried out using a microprocessor. The performance levels required of the microprocessor depend on the switching frequency of the phase compensation circuit and the time needed for the other operations (for example: estimations, calculations, PLL (Phase-Lock Loop), etc). In particular, the current regulation function by pulse width modulation PWM supplying the driver signal for the PFC module of the variable speed drive and the profile generation function based on measurement of the rectified current are functions that can be time-consuming when carried out in digital technology.

Since the performance levels required are normally fairly high, such an entirely digital solution entails using a high-performance digital signal processor, in particular if this processor must also manage the algorithms used by the variable speed drive to control the motor. Otherwise, the use of an additional dedicated microprocessor for the phase compensation circuit would also be possible, but this solution would, however, prove costly.

SUMMARY OF THE INVENTION

The object of the invention is therefore to propose a simple and cost-effective power-factor correction device, suited to a variable speed drive supplied with single-phase power, so as to conform to the IEC61000 standards concerning limitation of the current level of emitted harmonics.

For this, the invention describes a variable speed drive for three-phase electric motor, comprising a rectifier module supplying a rectified voltage from a single-phase alternating current electrical network, a voltage step-up module supplying a regulated bus voltage from said rectified voltage, an inverter module powered by said bus voltage and supplying a control voltage to the three-phase electric motor from a control set-point and a digital processing unit supplying said control set-point. The variable speed drive comprises a hybrid power-factor correction device which drives the voltage step-up module and which comprises a digital circuit provided with a voltage regulator module supplying a correction signal from a measurement signal of said bus voltage and an analogue circuit supplying a driver signal to the step-up module from a measurement signal of said rectified voltage and from said correction signal.

Since the power-factor correction device is of hybrid design, that is, in analogue and digital technology, such a device can be used in practice to combine the benefits of both technologies, namely:

BRIEF DESCRIPTION OF THE DRAWINGS a digital circuit capable of providing a powerful regulation loop for the bus voltage of the variable speed drive to generate a PWM-converted, regulated correction signal, an analogue signal for setting up a current regulation loop based on this PWM correction signal and on a measurement signal of the rectified voltage. The analogue circuit is also used beforehand to limit in a simple way this measurement signal according to a predetermined form. The analogue circuit then supplies a driver signal to a solid-state switch of the voltage step-up module of the variable speed drive.

To optimize the solution, the digital circuit is preferably incorporated in the processing unit of the variable speed drive charged in particular with calculating the motor regulation and control loops for the variable speed drive. Thus, advantageously, the use of a specific processing unit is avoided.

Figure 2:
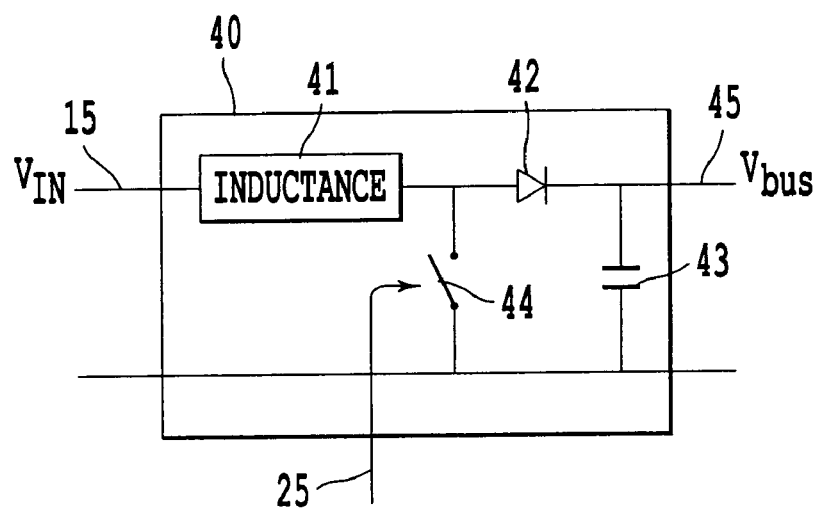
Figure 3:
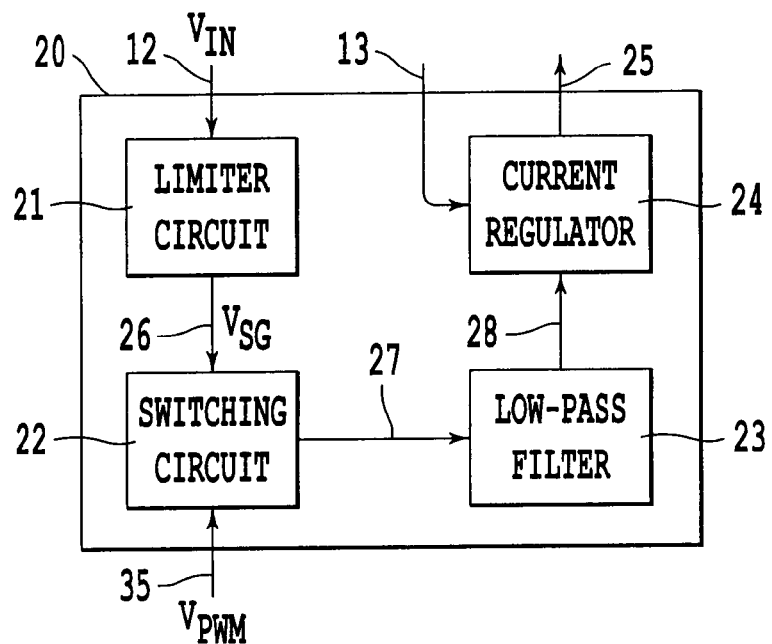
Figure 4:
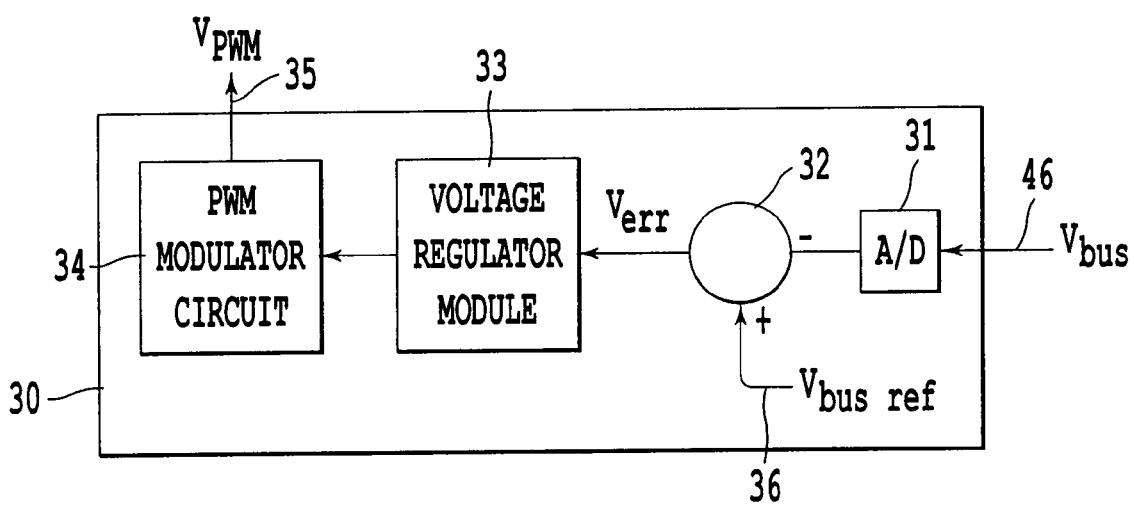
Figure 5:
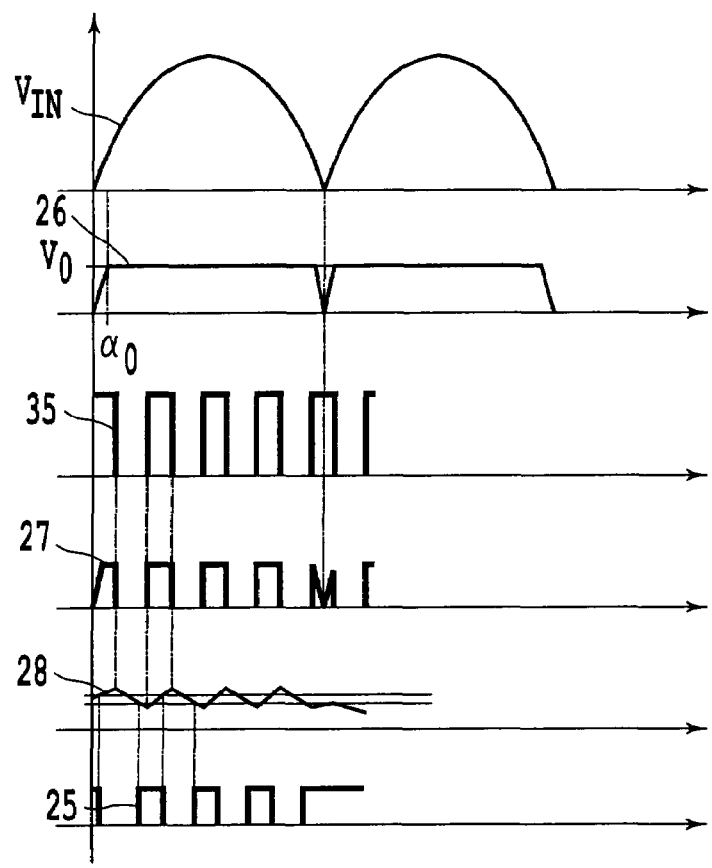
Figure 6:
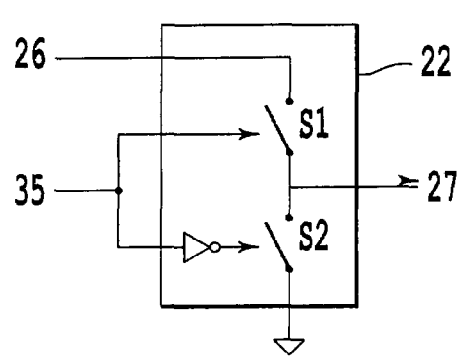
Figure 7:
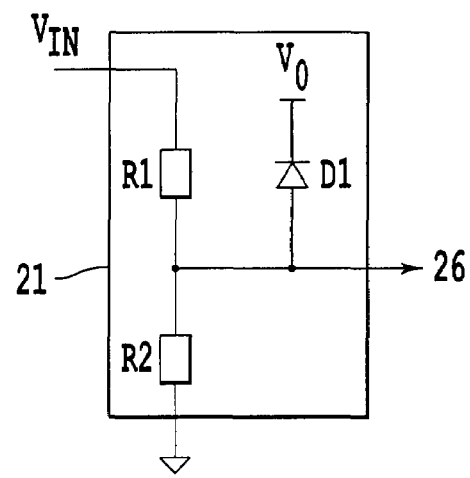
Figure 8:
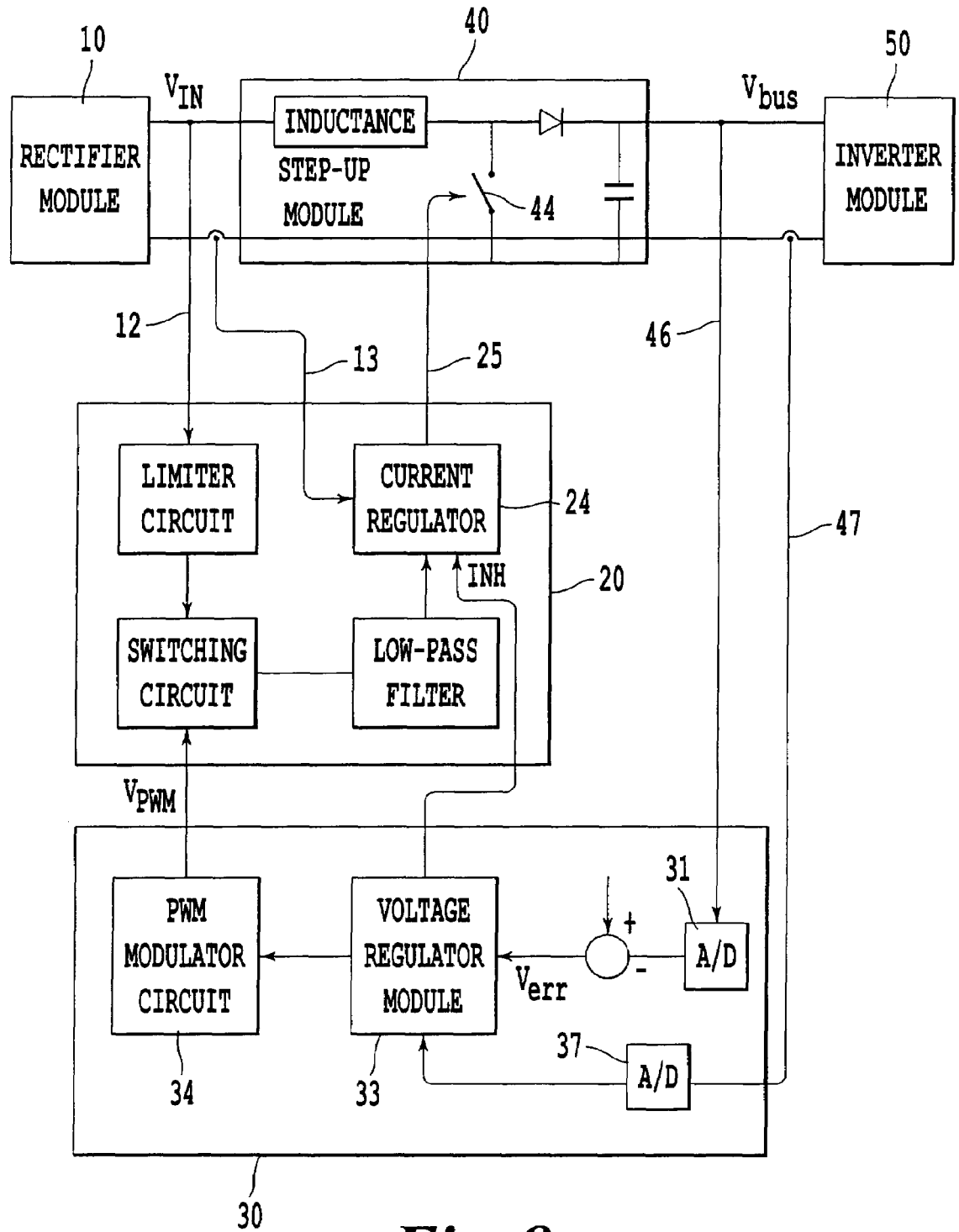

Other characteristics and advantages will become apparent from the detailed description that follows with reference to an embodiment given as an example and represented by the appended drawings in which:

FIG. 1 represents a simplified diagram of an embodiment of a variable speed drive according to the invention, FIG. 2 details the voltage step-up module of the variable speed drive of FIG. 1, FIGS. 3 and 4 respectively detail the analogue circuit and the digital circuit of a hybrid power-factor correction device of the variable speed drive, FIG. 5 gives a diagram of signals circulating in the hybrid power-factor correction device, FIG. 6 details an example of switching circuit for the hybrid power-factor correction device, FIG. 7 details an example of limiter circuit of the hybrid power-factor correction device, FIG. 8 represents a variant of the embodiment of FIG. 1.

DESCRIPTION OF THE PREFERRED EMBODIMENTS

With reference to FIG. 1, a variable speed drive is intended to monitor and control three-phase AC electric motor M, of asynchronous type. The variable speed drive is powere by an external single-phase AC electrical network 5. The variable speed drive comprises a rectifier module 10 which receives as its input an output of the electrical network 5 so as to deliver as output a rectified input voltage VIN 15. The rectifier module 10 is, for example, made up of a diode bridge of known type, which easily supplies a rectified periodic signal from the input AC network 5.

Downstream of the rectifier module 10, the variable speed drive comprises a voltage step-up module 40 connected to the rectifier module 10. From the rectified voltage $V_{IN}$ 15, the step-up module 40 supplies a regulated DC bus voltage 45 $V_{bus}$.

The variable speed drive then comprises a PWM-type inverter module 50 powered by the regulated bus voltage $V_{bus}$ 45 and intended to supply a control voltage to the three phases of the motor M from a control set-point. This control set-point originates from a processing unit (not shown in the figures) of the variable speed drive. This processing unit is in particular charged with managing motor control (also called MCC, standing for Motor Control Core) and is based on a microcontroller, a microprocessor, a DSP (Digital Signal Processor) or equivalent.

As indicated in FIG. 2, the voltage step-up module 40 of the variable speed drive has a known structure which includes an inductance 41 (often called boost inductance) connected between the positive terminal of the rectified voltage $V_{IN}$ 15 and the anode of a diode 42 (boost diode). The cathode of the diode 42 is linked to the output of the step-up module 40, that is, to the positive terminal of the bus voltage $V_{bus}$ 45. A bus capacitor 43 (for example of the electrolytic capacitor type) is linked between the cathode of the diode 42 and the negative terminal of the bus voltage $V_{bus}$ 45. A switch 44 (preferably of solid-state switch type, such as a power transistor) has one end linked between the inductance 41 and the anode of the diode 42 and another end linked to the negative terminal of the rectified voltage $V_{IN}$ 15. These two ends are connected when the switch 44 is closed and disconnected when the switch 44 is open. The switch 44 is driven by a driver signal 25 coming from a power-factor correction device of the variable speed drive.

According to the invention, the power-factor correction device of the variable speed drive is a hybrid circuit, that is, produced in digital technology and analogue technology.

It therefore comprises a first digital circuit 30 which receives as input a measurement signal 46 representative of the bus voltage $V_{bus}$. This measurement signal 46 can, of course, be obtained from the bus voltage $V_{bus}$ 45 via a divider bridge not shown in the figures. According to the embodiment of FIG. 4, the digital circuit 30 comprises an analogue/digital converter 31 linked to the input signal 46. The output of the converter 31 is linked to one of the inputs of a summer 32, the other input of which receives a set-point value 36 of bus voltage $V_{bus\ ref}$. This set-point value $V_{bus\ ref}$ can be generated by the processing unit of the variable speed drive by different means not detailed here (internal calculation, external set-point, etc).

The output of the summer 32 therefore supplies the difference between the signals 36 and 46, that is, a signal $V_{err}$ representing the error on the bus voltage. This difference $V_{err}$ is received by a voltage regulator module 33 which delivers as output a regulated correction signal that can be used to correct the bus voltage 45. The correction signal is then converted to a PWM-type signal by a PWM modulator circuit 34 which delivers the correction signal $V_{PWM}$ 35 as output from the digital circuit 30.

The power-factor correction device also comprises a second analogue circuit 20 which receives as input the correction signal $V_{PWM}$ 35. According to the embodiment of FIG. 3, the analogue circuit 20 comprises a limiter circuit 21 (also called Shape Generator) which receives as input a measurement signal 12 representative of the rectified periodic voltage $V_{IN}$. This measurement signal 12 can be obtained from the rectified voltage $V_{IN}$ 15 via a divider bridge not shown in the figures. In the preferred embodiment, the function of the limiter circuit 21 is to generate as simply as possible a clipped signal $V_{SG}$ 26, the profile of which is roughly trapezoidal, by clipping the measurement signal 12 to a predetermined value $V_0$ (see FIG. 5).

An exemplary representation of the schematic diagram of how the limiter circuit 21 operates is given in FIG. 7. The input signal 12, representing $V_{IN}$, is linked to a resistor divider bridge formed by two resistors R1 and R2 in series (or by two groups of resistors R1 and R2 in series). The mid-point of the divider bridge between the resistors R1 and R2 is connected to the anode of a limiting diode D1, the cathode of which is linked to a limiting voltage source of value $V_0$. The mid-point of the divider bridge also supplies the output signal $V_{SG}$ 26 of trapezoidal form for the limiter circuit 21.

On startup, the value of the periodic signal $V_{SG}(t)$ progresses with the value of the periodic signal $V_{IN}(t)$ in a ratio (R2/R1+R2), until the value $V_0$ is reached. This instant corresponds to an angle $\alpha_0$. Then, the value of $V_{SG}(t)$ remains at the level of $V_0$ until the instant when $\omega t$ reaches the value $(\pi-\alpha_0)$, $\omega$ representing the frequency of the periodic signal $V_{IN}(t)$. Finally, from the instant, $V_{SG}(t)$ again follows the value of the periodic signal $V_{IN}(t)$ and the ratio (R2/R1+R2), as indicated in FIG. 5. The angle $\alpha_0$ represents the angle of the rising/falling edge of $V_{SG}(t)$ and its value depends on the ratio (R2/R1+R2) of the divider bridge. Thus:

$V_{SG}(t)=V_{IN}(t)*(R2/R1+R2)$ when: $0<=\omega t<\alpha_0$ $V_{SG}(t)=V_0$ when: $\alpha_0<=\omega t<\pi-\alpha_0$ $V_{SG}(t)=V_{IN}(t)*(R2/R1+R2)$ when: $\pi-\alpha_0<=\omega t<\pi$ A wise choice of values of R1 and R2 makes it possible to optimize the value of the angle $\alpha_M$. Preferably, an angle $\alpha_0$ between 5° and 30° gives satisfactory results with which to minimize the harmonics generated by the variable speed drive and to thus be able to minimize the size of the bus capacitor 43. Moreover, the trapezoidal form of the clipped signal $V_{SG}$ 26 gives better results than a sinusoidal form of attenuated amplitude and is simpler to produce than a staircase form which would require time-consuming digital processing means in the limiter circuit 21.

The analogue circuit 20 then comprises a switching circuit 22 (also called Switching Network) which receives as input the signal $V_{SG}$ 26 and the correction signal $V_{PWM}$ 35 so as to generate as output a signal 27 (see FIG. 5). A simplified example of the schematic diagram of operation of the switching circuit 22 is given in FIG. 6. The output signal 27 is switched alternately either to the signal 26 or to zero (Ground), according to pulses originating from the signal 35 through two switches S1 and S2 respectively actuated by the signal 35 and by the inverse of the signal 35.

The output signal 27 of the switching circuit 22 is then introduced into a low-pass filter 23 to give an analogue current reference signal 28. This signal 28 thus represents the current reference signal for the current present at the input of the voltage step-up module 40.

The analogue circuit 20 then comprises a current regulator 24, one input of which is the current reference signal 28 and the other input of which is a measurement signal 13 representative of the input current $I_{IN}$ supplied to the voltage step-up module 40. At the output, the current regulator 24 generates an on-off driver signal 25 that will be applied to the gate of the solid-state switch 44 to open or close this switch.

According to a simple embodiment represented in FIG. 5, the current regulator 24 can be a simple regulator of hysteresis type delivering an on-off output, in which:

when the signal 28 becomes greater than $I_{IN}+\epsilon$, then the driver signal 25 orders a closure of the switch 44 so as to be able to increase $I_{IN}$, and when the signal 28 becomes less than $I_{IN}-\epsilon$, then the driver signal 25 orders an opening of the switch 44, $\epsilon$ representing the hysteresis value.

The driver instruction 25 is transmitted to the gate of the switch 44 via a conventional gate driver type circuit, not shown in the figures.

FIG. 8 describes a variant of the embodiment of FIG. 1 of the invention in which there is introduced an additional duty mode (standby mode) enabling the opening of the switch 44 to be forced when the variable speed drive has no motor load, for example when the motor is stopped. This feature makes it possible in particular to minimize the consumption of electrical energy by avoiding unnecessarily discharging the bus capacitor.

For this, a measurement signal 47 representative of the load current of the variable speed drive is sent to an analogue/digital converter 37 of the digital circuit 30. The output of the converter 37 is sent to the voltage regulator module 33. In this variant, the module 33 then performs an additional function to select between two duty modes: a "normal" duty mode corresponding to the normal operation described previously, and a "standby" duty mode in which the module 33 activates an inhibit signal INB intended for the current regulator 24. When the inhibit signal INB is active, then the current regulator 24 forces the driver signal 25 so as to control the opening of the switch 44.

The module 33 selects the "standby" duty mode when the signal 47 indicates that no load current is flowing, that is, when it detects that there is no motor load. It would also be possible, in an equivalent manner, to consider that the indication of detection of the absence of motor load received by the voltage regulator module 33 could be performed by other means (for example, by a motor stopped detection).

When the signal 47 indicates that a load current is present, the module 33 selects the "normal" duty mode so as to regulate the opening and closure of the switch 44 as described previously.

It is, of course, possible, without departing from the scope of the invention, to imagine other variants and refinements of detail and even to consider the use of equivalent means.

The invention claimed is:

1. A variable speed drive for a three-phase electric motor, comprising:
    a rectifier module that supplies a rectified voltage from a single-phase alternating current electrical network;
    a voltage step-up module that supplies a regulated bus voltage from the rectified voltage;
    an inverter module powered by the bus voltage and that supplies a control voltage to the three-phase electric motor from a control set-point;
    a digital processing unit that supplies the control set-point; and
    a hybrid power-factor correction device that drives the voltage step-up module and that comprises:
        a digital circuit including a voltage regulator module that receives a measurement signal of the bus voltage from the voltage step-up module and that supplies a correction signal based on the received measurement signal of the bus voltage, and
        an analog circuit that receives a measurement signal of the rectified voltage from the rectifier module, that receives the correction signal from the digital circuit, and that supplies a driver signal to the step-up module based on the received measurement signal of the rectified voltage and the received correction signal.

2. A variable speed drive according to claim 1, wherein the digital circuit is incorporated in the processing unit.

3. A variable speed drive according to claim 1, wherein the correction signal is a pulse width modulation (PWM) signal.

4. A variable speed drive according to claim 1, wherein the step-up module includes a solid-state switch actuated by the driver signal.

5. A variable speed drive according to claim 4, wherein the analog circuit includes a limiter circuit that receives as an input the measurement signal of the rectified voltage and that generates as an output a clipped signal of roughly trapezoidal form.

6. A variable speed drive according to claim 5, wherein the limiter circuit includes a resistor divider bridge and a limiting diode including an anode connected to a mid-point of the divider bridge.

7. A variable speed drive according to claim 5, wherein the analog circuit further includes a switching circuit that receives as an input the clipped signal and the correction signal to generate a current reference signal.

8. A variable speed drive according to claim 7, wherein the analog circuit further includes a hysteresis-type current regulator that receives as an input the current reference signal and a current measurement signal to deliver as an output the driver signal to the solid-state switch.

9. A variable speed drive according to claim 8, wherein the voltage regulator module forces the current regulator to deliver a driver signal ordering the solid-state switch to open in absence of a variable speed drive load current.

10. A variable speed drive according to claim 9, wherein the digital circuit receives a measurement signal representative of the variable speed drive load current.

* * * * *